(12) United States Patent
Koike et al.

(10) Patent No.: US 6,599,066 B1
(45) Date of Patent: Jul. 29, 2003

(54) ROTATING SHAFT DEVICE AND MACHINE TOOL

(75) Inventors: Shinji Koike, Kanagawa (JP); Shinichi Inoue, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 0 days.

(21) Appl. No.: 09/869,283

(22) PCT Filed: Nov. 15, 1999

(86) PCT No.: PCT/JP99/06370

§ 371 (c)(1),
(2), (4) Date: Jun. 26, 2001

(87) PCT Pub. No.: WO01/31215

PCT Pub. Date: May 3, 2001

(30) Foreign Application Priority Data

Oct. 26, 1999 (JP) ............................................ 11-304234
Oct. 29, 1999 (JP) ............................................ 11-309448

(51) Int. Cl.⁷ ............................ B23C 9/00; F16C 33/00; F16N 13/22
(52) U.S. Cl. ........................... 409/135; 184/12; 384/469
(58) Field of Search ................................. 409/135, 231; 384/113, 291, 469, 191.2, 286, 279; 184/12

(56) References Cited

U.S. PATENT DOCUMENTS

| 3,804,476 | A | * | 4/1974 | Nakamura et al. | ........... 384/469 |
| 3,851,933 | A | * | 12/1974 | Jacobson | .................... 384/113 |
| 4,008,788 | A | * | 2/1977 | Whitt | ......................... 184/12 |
| 5,640,769 | A | | 6/1997 | Suzuki et al. | |
| 5,885,008 | A | * | 3/1999 | Ward | ......................... 384/291 |

FOREIGN PATENT DOCUMENTS

| EP | 0 458 499 A2 | | 5/1991 | |
| GB | 2071427 A | * | 9/1981 | ................. 384/291 |
| JP | T13-2490 | | 9/1924 | |
| JP | 58-172193 | | 11/1983 | |
| JP | 61-16252 | | 1/1986 | |
| JP | 63-62638 | | 3/1988 | |
| JP | 64-87130 | | 3/1989 | |
| JP | 4-57355 | | 2/1992 | |
| JP | 7-024687 | | 1/1995 | |
| JP | 8-118199 | | 5/1996 | |
| JP | 2542700 | | 7/1996 | |
| JP | 8-309643 | | 11/1996 | |
| JP | 409023607 A | * | 1/1997 | ................. 384/291 |
| JP | 409100838 A | * | 4/1997 | ................. 409/231 |
| JP | 2677505 | | 7/1997 | |
| JP | 10103347 A | * | 4/1998 | ................. 409/231 |
| JP | 02000345179 A | * | 12/2000 | ................. 384/469 |
| JP | 02001099166 A | * | 4/2001 | ................. 409/231 |
| RU | SU 1 663 258 A | | 7/1991 | |

* cited by examiner

*Primary Examiner*—William Briggs
(74) *Attorney, Agent, or Firm*—Paul & Paul (57) ABSTRACT

The invention relates to a rotating shaft apparatus for rotationally driving a spindle or a feed screw shaft and a machine tool including the rotating shaft apparatus, and is directed to enhance durability of a rotating shaft apparatus if the rotating shaft such as a spindle or a feed shaft rotates at a high speed. In order to solve the problem, according to the invention, a rotating shaft is rotationally supported by a bearing to a housing, the bearing being previously applied to or filled with a lubricant. A lubricant impregnated member, which is impregnated with a lubricant to be supplied to the bearing, is provided in the rotating shaft. The lubricant is separated and discharged from the lubricant impregnated member by centrifugal force due to the rotation of the shaft. The lubricant is supplied to the bearing through a lubricant supplying passage which is provided for fluidly connecting a space in or adjacent the bearing to the lubricant impregnated member,

7 Claims, 4 Drawing Sheets

ROTATING SHAFT DEVICE AND MACHINE TOOL

TECHNICAL FIELD

The present invention relates to a rotating shaft apparatus for driving a spindle to which a tool or a workpiece is mounted or for driving feed screw shafts provided in X-, Y- and Z-orthogonal three axes, and a machine tool such as a milling machine, a machining center, a grinding machine, a lathe, an electric discharge machine. The invention relates to a novel technique which enhances the durability if the rotating shaft, such as a spindle or a feed shaft rotates at a high rotational speed.

BACKGROUND ART

In rotating shaft apparatuses having a spindle or feed shafts of a machine tool, bearings, for rotationally supporting the shaft, generate a heat due to the rotation of the rotating shaft. The heat is transmitted to the rotating shaft to increase the temperature of the rotating shaft, which results in a thermal deformation thereof. For example, a spindle apparatus which rotates at a high speed exhibits remarkably such a trend. Therefore, a liquid coolant for cooling the spindle and preventing the increase in the temperature thereof and a lubrication for the bearings for supporting the spindle are required to be effective and optimum. On the other hand, increase in feeding speed of the X-, Y- and Z-orthogonal three axes is also desired. Therefore, as in case of the spindle, a liquid coolant for cooling the feed shafts and preventing the increase in the temperature thereof and a lubrication for the bearings for supporting the feed shafts are required to be effective and optimum. In such a field of the art, there are the following prior art.

As a first prior art, Japanese Unexamined Patent Publication (Kokai) No. 63-62638 discloses lubricating apparatus for a machine tool having a vertical spindle. The apparatus executes a jet lubrication in which a lubricating oil in the form of a jet is directed to a rolling member provided between inner and outer races of a bearing for rotationally supporting a spindle through a lubricating oil supplying nozzle provided adjacent the bearing, the lubricating oil being supplied to the nozzle from a lubricating oil supplying apparatus provided outside of the spindle apparatus through a lubricating oil supplying conduit.

As a second prior art, Japanese Unexamined Patent Publication (Kokai) No. 61-16252 discloses a bearing lubricating apparatus. The apparatus executes an oil air lubrication in which a lubricating oil in the form of an aerosol is directed to a rolling member provided between inner and outer races of a bearing for rotationally supporting a spindle through a lubricating oil supplying pipe provided adjacent the bearing, the lubricating oil being supplied to the lubricating oil supplying pipe from a lubricating oil supplying apparatus provided outside of the spindle apparatus through a lubricating oil supplying conduit.

As a third prior art, Japanese Patent Publication No. 2541700 discloses a bearing lubricating apparatus. The apparatus executes an under-race lubrication in which a lubricating oil is directed, by centrifugal force due to the rotation of a spindle, to a rolling member provided between inner and outer races of a bearing through a passage provided in the inner race of the bearing, the lubricating oil being supplied to a lubricating oil supplying passage provided in the spindle along the axis thereof from a lubricating oil supplying apparatus provided outside of the spindle apparatus.

As a fourth prior art, Japanese Unexamined Patent Publication (Kokai) No. 4-57355 discloses a spindle apparatus. The apparatus executes another type under-race lubrication by a configuration different from the third prior art. The lubricating oil is directed, by centrifugal force due to the rotation of a spindle, to a rolling member provided between inner and outer races of a bearing through a passage provided in the inner race of the bearing, the lubricating oil being supplied to a lubricating oil supplying passage provided in a drawbar, inserted in the spindle for drawing a tool to the spindle, from a lubricating oil supplying apparatus provided outside of the spindle apparatus.

AS a fifth prior art, Japanese Unexamined Patent Publication (Kokai) No. 64-87130 discloses a spindle apparatus in which a liquid coolant flows through a spindle. The liquid coolant is supplied into a space, between a cavity formed in the spindle and a drawbar provided in the cavity, from a coolant source provided outside of the spindle apparatus to cool the spindle from its inside. The bearings for rotationally supporting is indirectly cooled by the liquid coolant.

As a sixth prior art, Japanese Publication No. 2677505 discloses a spindle apparatus. In this apparatus, a liquid lubricant is supplied into a space, between a cavity formed in the spindle and a drawbar provided in the cavity, or into a drawbar provided in the spindle for holding a tool to the spindle, from a lubricant source provided outside of the spindle apparatus to cool the spindle from its inside. Further, the lubricant is supplied, by the centrifugal force due to the rotation of the spindle, to the rolling members provided between inner and outer races of a bearing for rotationally supporting the spindle through a passage of the inner race to execute a under-race lubrication. The lubricant is further supplied to the housing to cool indirectly the outer race of the bearing and a built-in motor, thereafter the lubricant is recovered.

AS a seventh prior art, Japanese Unexamined Patent Publication (Kokai) No. 8-118199 discloses a feeding apparatus for a machine tool. In this apparatus, a liquid coolant is supplied into a cavity provided in a feed screw shaft from a coolant temperature adjusting apparatus provided outside of the feeding apparatus to cool the feed screw shaft from its inside. Further, the coolant is supplied, by centrifugal force generated by the rotation of the feed screw shaft, to the rolling members provided between inner and outer races of a bearing for rotationally supporting the feed screw shaft through a passage of the inner race to execute a under-race lubrication, thereafter the coolant is recovered.

In the jet lubrication of the first prior art, the liquid lubricant in the form of a jet is directed to the rolling member provided between the inner and outer races through a lubricant supplying nozzle. Therefore, special nozzle and liquid lubricant supply passage is required, which makes the configuration of the spindle apparatus complex. Further, since the liquid lubricant is supplied through a long lubricant supply passage, the liquid lubricant may be contaminated by a foreign particles, such as a dust so that the spindle is rapidly damaged by the foreign particles when the spindle rotates, in particular at a high rotational speed.

In the oil air lubrication of the second prior art, the liquid lubricant in the form of an aerosol is directed to the rolling member provided between the inner and outer races through the lubricating oil supplying nozzle. Therefore, as in the first prior art, special nozzle and liquid lubricant supply passage is required, which makes the configuration of the spindle apparatus complex. Further, since the liquid lubricant is supplied through a long lubricant supply passage, the liquid lubricant may be contaminated by a foreign particles, such as a dust so that the spindle is rapidly damaged by the foreign particles when the spindle rotates, in particular at a high rotational speed.

In the under-race lubrication of the third prior art, the liquid lubricant is supplied to the rolling member provided between the inner and outer races through the passage provided in the inner race by the centrifugal force due to the rotation of a spindle. According to the under-race lubricant, when the spindle rotates at a high rotational speed, for example above 20000 min$^{-1}$, it is difficult to control the flow rate of the liquid lubricant supplied to the bearing by the effect of the centrifugal force due to the rotation of the spindle, and in some case, the increase in the amount of the lubricant supplied to the bearing results in the increase in the heat generated by the shearing force between the rolling member and the liquid lubricant. Further, since the liquid lubricant is supplied to the lubricant supplying passage provided in the spindle from the lubricating oil supplying apparatus provided outside of the spindle apparatus, the liquid lubricant flowing through a long lubricant supply passage system may be contaminated by a foreign particles, such as a dust existing in the system so that the passage between the lubricant supplying passage in the spindle and the bearing is blocked by the foreign particles, and the spindle is rapidly damaged by insufficient lubrication.

Although the under-race lubrication of the fourth prior art is different from that of the third prior art, the fourth prior art has a problem the same as the third prior art that the passage between the lubricant supplying passage in the spindle and the bearing is blocked by the foreign particles.

In the sixth prior art, a core cooling is executed in which the liquid lubricant for the bearing is supplied into the cavity formed in the spindle from the lubricant source provided outside of the spindle apparatus to cool the spindle from its inside. Thereafter, the lubricant is supplied, by the centrifugal force due to the rotation of the spindle, to the rolling members provided between inner and outer races of the bearing for rotationally supporting the spindle through a passage of the inner race to execute a under-race lubrication. The lubricant is further supplied to the housing to cool indirectly the outer race of the bearing and the built-in motor, thereafter the lubricant is recovered. Cooling of a spindle and lubrication for a bearing is essentially different from each other. Therefore, when the spindle is cooled by a lubricant for a bearing, it is not possible to optimize both the cooling of the spindle and the lubrication for the bearing. Further, in the configuration that the liquid lubricant for dual-purpose of lubrication and cooling is supplied to the cavity of the spindle from the liquid lubricant supplying apparatus provided outside of the spindle and the liquid lubricant outcome from the spindle is recovered to the lubricant source, the liquid lubricant may be contaminated by a foreign particles, such as a dust so that the spindle is rapidly damaged by the foreign particles when the spindle rotates, in particular at a high rotational speed.

In the under-race lubrication of the seventh prior art, the liquid coolant is supplied into the cavity provided in a feed screw shaft from the coolant temperature adjusting apparatus provided outside of the feeding apparatus to cool the feed screw shaft from its inside, then the coolant is supplied, by centrifugal force generated by the rotation of the feed screw shaft, to the rolling members provided between inner and outer races of a bearing from the cavity of the spindle. In the seventh prior art, as in the sixth prior art, the feed screw shaft is cooled by the lubricant for the bearing. Therefore, there are problems that it is not possible to optimize both the cooling of the spindle and the lubrication of the bearing, and the spindle is rapidly damaged by the foreign particles involved in the liquid lubricant.

SUMMARY OF THE INVENTION

The invention is directed to solve the above-described problems, and the objection of the invention is to provide a rotating shaft apparatus and a machine tool having the rotating shaft apparatus, which apparatus is enhanced its durability if the rotating shaft rotates at a high rotational speed.

Further, the objective of the invention is to provide a rotating shaft apparatus and a machine tool having the rotating shaft apparatus having a relatively simple configuration. The apparatus allows a lubricant to be supplied to the bearing at an optimized flow rate if the rotating shaft rotates at a high rotational speed.

Further, the objective of the invention is to provide a rotating shaft apparatus and a machine tool having the rotating shaft apparatus, which apparatus improved to prevent contamination in the lubricant.

Further, the objective of the invention is to provide a rotating shaft apparatus and a machine tool having the rotating shaft apparatus, which apparatus improved to optimize the cooling of the spindle and the lubrication for the bearing.

Further, the objective of the invention is to provide a rotating shaft apparatus and a machine tool having the rotating shaft apparatus, which apparatus improved to effectively cool the spindle as well as to prevent contamination in the lubricant.

In order to achieve the above-described objectives, according to the invention, a rotating shaft is rotationally supported by a bearing to a housing, the bearing being previously applied to or filled with a lubricant. A lubricant impregnated member, which is impregnated with a lubricant to be supplied to the bearing, is provided in the rotating shaft. The lubricant is separated and discharged from the lubricant impregnated member by centrifugal force due to the rotation of the shaft. The lubricant is supplied to the bearing through a lubricant supplying passage which is provided for fluidly connecting a space in or adjacent the bearing and the lubricant impregnated member.

According to the invention, there is provided a rotating shaft apparatus for driving a shaft rotationally supported by a housing, comprising a bearing for rotationally supporting the shaft in the housing, the bearing being previously applied to or filled with a lubricant; a lubricant impregnated member, which is impregnated with a lubricant to be supplied to the bearing and provided in the rotating shaft, the lubricant being separating and discharging the lubricant by centrifugal force due to the rotation of the shaft; and a lubricant supplying passage for fluidly connecting a space in or adjacent the bearing and the lubricant impregnated member to supply the lubricant which has been separated and discharged from the lubricant impregnated member.

According to the invention, a rotating shaft is rotationally supported to a housing by a bearing previously applied to or filled with a lubricant, and mounted in the rotating shaft is a lubricant impregnated member, which is impregnated with a lubricant to be supplied to the bearing so that the lubricant is separated and discharged from the lubricant impregnated member by centrifugal force due to the rotation of the shaft and supplied to the bearing through the lubricant supplying passage for fluidly connecting a space in or adjacent the bearing to the lubricant impregnated member. Therefore, the energy of centrifugal force due to the rotation of the shaft is consumed so that the excessive supply of the lubricant is prevented. The lubricant is supplied to the bearing only from the lubricant impregnated member which is mounted to the rotating shaft. Therefore, the lubricant for the bearing is not contaminated.

Providing a lubricant previously applied to or filled in the bearing prevents insufficient lubrication when the rotating shaft apparatus is activated first after the rotating shaft is assembled to the apparatus. The lubricant may include a grease or a base oil.

The lubricant impregnated member includes a permeable material or a non-woven material to which the lubricant is impregnated. In particular, the lubricant impregnated member may include a permeable member, for example a permeable polymeric material such as polyethylene, into which a liquid lubricant. Thereafter, the lubricant impregnated member is shaped into a bar by applying a heat. A microporous membrane member may be applied to the outer surface of the lubricant impregnated member.

Adjustment means for adjusting the rate of the lubricant supplied to the bearing from the lubricant impregnated member may be provided. The adjustment means may comprise an orifice provided in the lubricant supplying passage. Provision of the adjustment means allows optimization of the flow rate of the lubricant to prevent an excessive supply of the lubricant, which extends the life time of the lubricant impregnated member and prevents an excessive heat generation in the bearing.

Further, core cooling means may be provided in the shaft which means includes passages for supplying liquid coolant to the core portion of the rotating shaft from a coolant supplying and circulating apparatus, and for recovering the liquid coolant used for cooling the rotating shaft. In this case, the lubricant is supplied to the bearing only from the lubricant impregnated member which is mounted to the rotating shaft, and the lubrication for the bearing and the cooling of the rotating shaft can be independently carried out. Therefore, an optimized lubricant for the bearing and liquid coolant can be selected and supplied to the bearing and the shaft at optimized flow rates.

According to another feature of the invention, there is provided a machine tool for machining a workpiece by relatively moving a tool and the workplace to each other, comprising a table for mounting the workpiece; a feed mechanism for driving X-, Y- and Z-feed shafts for relatively moving a spindle to which the tool is mounted and the table to each other; a spindle to which the tool is mounted and is rotationally supported by a spindle head; a bearing for rotationally supporting the spindle to the spindle head; a lubricant impregnated member, which is impregnated with a lubricant to be supplied to the bearing and provided in the rotating shaft, for separating and discharging the lubricant by centrifugal force due to the rotation of the shaft; and a lubricant supplying passage for fluidly connecting a space in or adjacent the bearing and the lubricant impregnated member to supply the lubricant which has been separated and discharged from the lubricant impregnated member.

According to the invention, a lubricant impregnated member, which is impregnated with a lubricant to be supplied to the bearing, is mounted in the spindle of a machine tool, which holds a tool and is rotationally supported to a spindle head by a bearing, so that the lubricant is separated and discharged from the lubricant impregnated member by centrifugal force due to the rotation of the spindle and supplied to the bearing through the lubricant supplying passage for fluidly connecting a space in or adjacent the bearing and the lubricant impregnated member. Therefore, the lubricant for the bearing is not contaminated.

Further, core cooling means may be provided in the spindle which means includes passages for supplying liquid coolant to the core portion of the spindle from a coolant supplying and circulating apparatus, and for recovering the liquid coolant used for cooling the rotating shaft. In this case, the lubricant is supplied to the bearing only from the lubricant impregnated member which is mounted in the spindle, and the lubrication for the bearing and the cooling of the rotating shaft can be independently carried out. Therefore, an optimized lubricant for the bearing and liquid coolant can be selected and supplied to the bearing and the shaft at optimized flow rates.

According to another feature of the invention, there is provided a machine tool for machining a workpiece by relatively moving a tool and the workpiece to each other, comprising a feed mechanism for driving X-, Y- and Z-feed shafts for relatively moving the spindle and a table to each other; a bearing for rotationally supporting the feed screw shaft of the feed mechanism; a lubricant impregnated member, which is impregnated with a lubricant to be supplied to the bearing and provided in the feed screw shaft, for separating and discharging the lubricant by centrifugal force due to the rotation of the shafts and a lubricant supplying passage for fluidly connecting a space in or adjacent the bearing and the lubricant impregnated member to supply the lubricant which has been separated and discharged from the lubricant impregnated member.

According to the invention, a lubricant impregnated member, which is impregnated with a lubricant to be supplied to the bearing, is mounted in the feed screw shaft of a machine tool which is rotationally supported by a bearing, so that the lubricant is separated and discharged from the lubricant impregnated member by centrifugal force due to the rotation of the screw shaft and supplied to the bearing through the lubricant supplying passage for fluidly connecting a space in or adjacent the bearing and the lubricant impregnated member. Therefore, the lubricant for the bearing is not contaminated.

According to the above-described features of the invention, there is provided a machine tool having a rotating shaft apparatus in which the durability is enhanced if the rotating shaft, such as the spindle or the feed screw shaft rotates at a high speed.

A relatively simple configuration in which a lubricant impregnated member, which is impregnated with a lubricant to be supplied to the bearing, is provided in a rotating shaft, such as a spindle or a feed screw shaft, allows optimized and minimized amount of lubricant to be supplied to the bearing. Therefore, excessive heat generation due to excessive supply of the lubricant is prevented.

The lubricant is supplied to the bearing from the lubricant impregnated member which is mounted in the rotating shaft such as a spindle or a feed screw shaft through a lubricant supplying passage. Therefore, the lubricant supplied to the bearing is not contaminated by foreign particles such as a dust and the excessive heat generation is prevented so that a clean and durable rotating shaft apparatus is realized.

If core cooling means is provided in the shaft, which means includes passages for supplying liquid coolant to the core portion of the rotating shaft from a coolant supplying and circulating apparatus, and for recovering the liquid coolant used for cooling the rotating shaft, the lubricant is supplied to the bearing only from the lubricant impregnated member which is mounted to the rotating shaft, and the lubrication for the bearing and the cooling of the rotating shaft can be independently carried out. Therefore, an optimized lubricant for the bearing and liquid coolant can be selected and supplied to the bearing and the shaft at optimized flow rates.

In the first and second prior art, the liquid lubricant is directed from the lubricant supplying apparatus, provided outside of the spindle apparatus, to the rolling member provided between inner and outer races through the lubricant supplying nozzle. On the other hand, in the invention, the lubricant is supplied from the lubricant impregnated member to a bearing through the lubricant supplying passage. Therefore, the lubricant is not contaminated by foreign particles such as a dust so that the rapid wear of the bearing is prevented. Further, the lubricant does not seep out of the lubricant impregnated member if it is employed to a spindle or a feed screw shaft which rotates about a vertical axis.

The under-race lubrication of the third and fourth prior art has problems that the lubricant may be excessively supplied to the bearing by the effect of centrifugal force due to the rotation of the spindle and that the lubricant is contaminated by foreign particles such as a dust. On the other hand, the invention is not involved such problems.

The fifth prior art is merely a spindle core cooling. On the other hand, the invention employs a novel configuration in that the lubricant is supplied to the bearing from the lubricant impregnated member to optimize the lubrication of the bearing and to prevent the heat generation in the spindle and the bearing.

The sixth and seventh prior art uses a liquid lubricant for lubricating a bearing and for cooling the core portion of the spindle or the feed screw shaft. On the other hand, according to the invention, the liquid coolant and the liquid lubricant are independently supplied to the spindle or the screw shaft and the bearing to optimize the cooling of the spindle and the lubrication of the bearing.

BEST MODE FOR CARRYING OUT THE INVENTION

A preferred embodiment of the invention will be described below with reference to the accompanied drawings.

Figure 4:
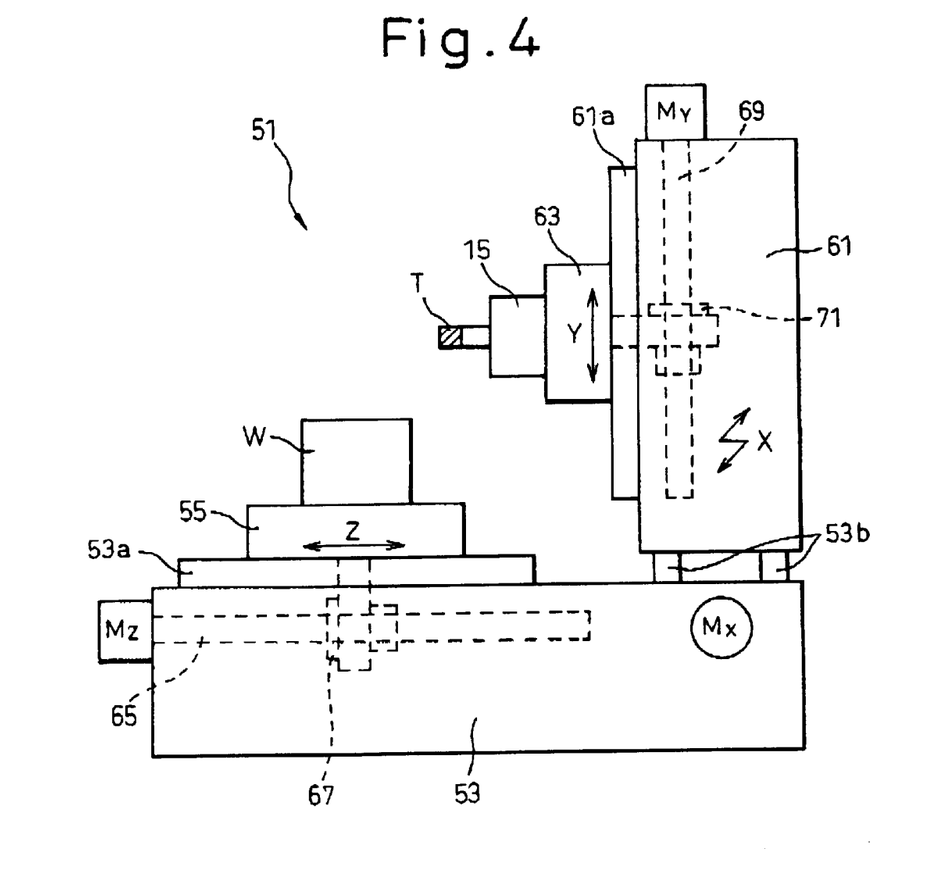
FIG. 4 is a schematic side view of a machine tool including a rotating shaft apparatus of the invention.

Referring to FIG. 4, an example of a machine tool 51 has a rotating shaft apparatus, such as a spindle apparatus or a feed shaft apparatus according to the invention. The machine tool 51 comprises a bed 53 which is fixed to the floor of a factory. Z-axis guide rails 53a extend along horizontal Z-axis on a top face of the bad 53. A table 55, for securing a work W, is slidably mounted on the Z-axis guide rails. On a top face of the bad 53, X-axis guide rails 53b extend along horizontal X-axis perpendicular to the Z-axis (perpendicular to the drawing). A column 61 is slidably mounted on the X-axis guide rails. In the front face of the column 61 facing the work W, Y-axis guide rails 61a extend along vertical Y-axis. A spindle head 63, for rotationally supporting a spindle apparatus 11 of the invention, is slidably mounted to the Y-axis guide rails 61a.

A Z-axis feed screw 65, as a Z-axis feed shaft, extends along the Z-axis in the bed 53 under the table 55. A nut 67 is mounted to the bottom face of the table 55 for engaging the Z-axis feed screw 65. A Z-axis feed servo-motor $M_a$ is coupled to one end of the Z-axis feed screw 65. Driving the Z-axis feed servo-motor $M_a$ to rotate the Z-axis feed screw 65 moves the table 55 along the Z-axis guide rails 53a. Likewise, an X-axis feed screw (not shown), as an X-axis feed shaft, extends along the X-axis in the bed 53 under the column 61. A nut 67 is mounted to the bottom face of the table 55 for engaging the X-axis feed screw. An X-axis feed servo-motor $M_a$ is coupled to one end of the X-axis feed screw. Driving the X-axis feed servo-motor $M_x$ to rotate the X-axis feed screw moves the column 61 along the X-axis guide rails 53b. Further, an Y-axis feed screw 69, as an Y-axis feed shaft, extends along the Y-axis in the column 61. A nut 71 is mounted to the back face of the spindle head 63 for engaging the Y-axis feed screw 69. An Y-axis feed servo-motor $M_y$ is coupled to one end of the Y-axis feed screw 69. Driving the Y-axis feed servo-motor $M_y$ to rotate the Y-axis feed screw 69 moves the spindle head 63 along the Y-axis guide rails 61a.

A tool T is mounted to the distal end of a spindle of the spindle apparatus 11. The machine tool 51 machines the work W into a desired shape by moving the tool T in X-, Y- and X-axes relative to the work W with the spindle apparatus 11 rotating.

Figure 1:
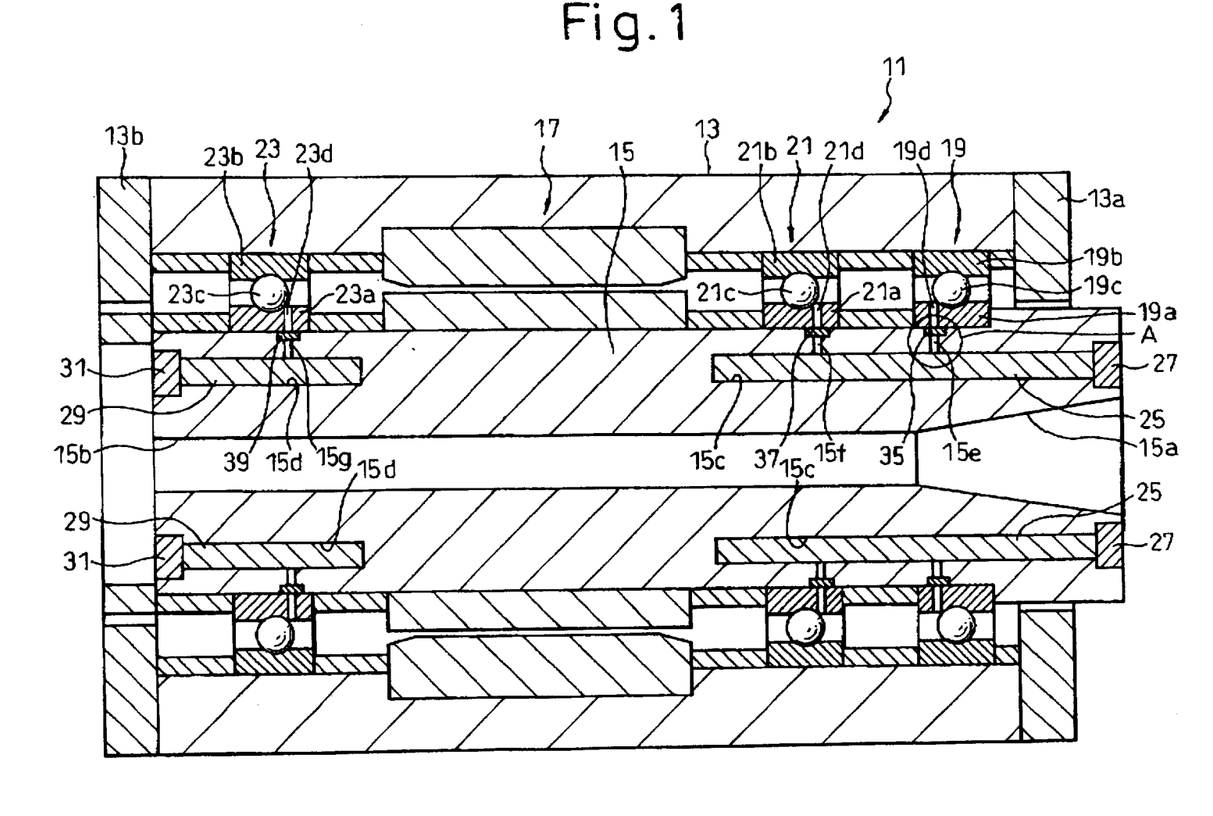
FIG. 1 is a longitudinal section of a first embodiment of the rotating shaft apparatus according to the invention.

Referring to FIG. 1, a first preferable embodiment of the spindle apparatus 11 as a rotating shaft apparatus of the invention is shown.

The spindle apparatus 11 comprises a housing 14 including an axial cavity, at least two bearings provided in the cavity, in this embodiment, two front bearings 19 and 21 facing the work W (FIG. 4) and a rear bearing 23, and a spindle 15 supported by the bearings 19, 21 and 23. According to the embodiment, the bearings 19, 21 and 23 comprise ball bearings which respectively include rolling members (balls) 19c, 21 and 23c provided between respective inner and outer races 19a, 19b; 21a, 21b and 23a, 23b. The inner races 19a, 21a and 23a of the bearings 19, 21 and 23 include bearing side lubricant passages 19d, 21d and 23d extending through the races from the inner surfaces to the outer surfaces, as described below. Lubricant, such as a grease or a base oil is previously applied or filled in the bearings 19, 21 and 23. In this embodiment, the spindle 15 is rotationally driven by a built-in motor 17, The spindle 15 includes a tapered hole 15a at the distal end thereof. A tapered portion of a tool holder (not shown) holding the tool T is fitted into the tapered hole 15a. The spindle 15 further includes a cavity 15b axially extending therethrough. Provided in the cavity 15b is a drawbar (not shown) for drawing a pull stud of the tool holder to hold the tool holder within the tapered hole 15a.

The spindle 15 includes a plurality of blind holes which extend from the end of the spindle in axial direction to provide an accommodation for lubricant impregnated members 25 described hereinafter. The plurality of blind holes 15c are disposed at an interval around the axis of the spindle 15. Likewise, the spindle 15, at the rear and thereof, includes a plurality of axially extending blind holes 15d, as an accommodation for lubricant impregnated members 29, the holes being disposed at an interval around the spindle axis.

The lubricant impregnated members 25 and 29 are introduced into the blind holes 15c and 15d and detachable caps or closures 27 and 31 close the holes. Detaching the closures 27 and 31 allows the used lubricant impregnated members 25 and 29 to be changed. In that event, it is preferable that the lubricant impregnated members 25 and 29 can be changed without directly touching them. Each of the lubricant impregnated members 25 and 29 includes a permeable member as a holding member of, in particular, a permeable polymeric material such as polyethylene into which a liquid lubricant of a predetermined volume, for example, about 90% by volumetric ratio is impregnated. Thereafter, the impregnated holding member is shaped into a bar by applying a heat. A non-woven fabric, shaped into a bar to which a liquid lubricant is impregnated, may be used as the holding member of the lubricant impregnated members 25 and 29. In the lubricant impregnated member, the holding member and the liquid lubricant are coupled to each other so that the impregnated liquid lubricant does not seep out of the holding member under a condition where no external force acts on the liquid lubricant. An external force acting on the liquid lubricant, however, allows the liquid lubricant to be separated and discharged from the holding member under. A microporous membrane member may be applied to the outer surface of the lubricant impregnated members 25 and 29. Further, a powder lubricant can be used instead of the liquid lubricant.

Figure 3:
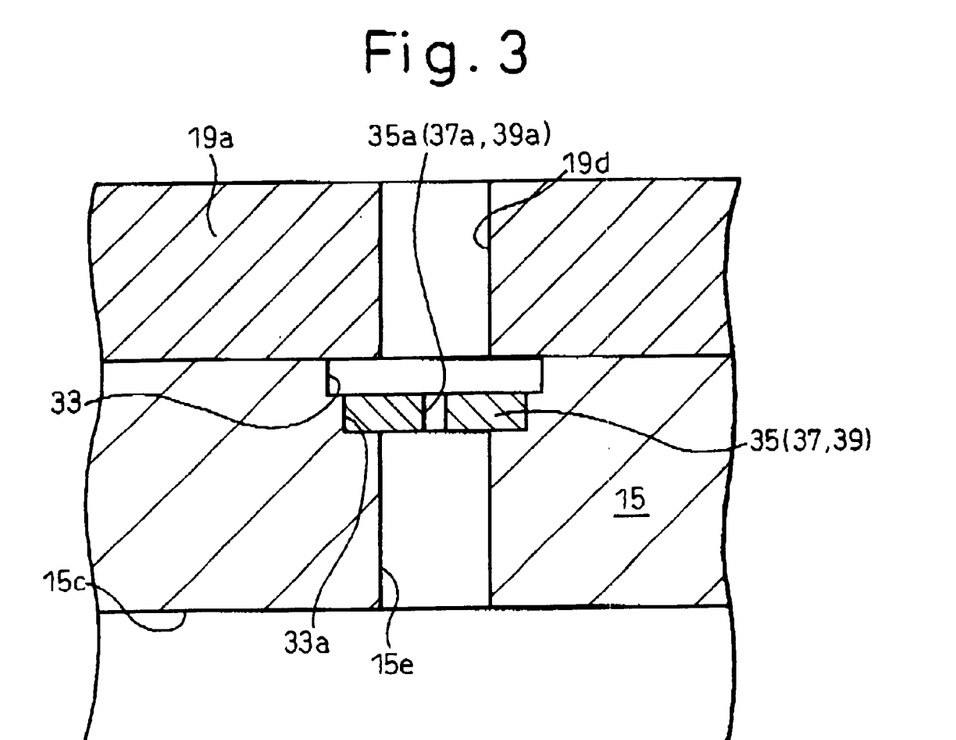
FIG. 3 is a sectional enlarged illustration of a portion indicated by "A" in FIGS. 1 and 2 showing a lubricant supplying passage.

Spindle side lubricant passages 15e and 15f radially outwardly extend toward the bearings 19 and 21 from the blind holes 15c in the distal end portion of the spindle 15. Spindle side lubricant passages 15g radially outwardly extend toward the bearing 23 from the blind holes 15d in the rear end portion of the spindle 15. Referring to FIG. 3 which an enlarged illustration of a portion indicated by "A" in FIG. 1, the spindle side lubricant passages 15e, 15f and 15g will be described in detail. Hereinafter, only the spindle side lubricant passages 15e will be described. However, the spindle side lubricant passages 15f and 15g are also arranged in the same manner.

Each of the spindle side lubricant passages 15e radially outwardly extends from each of the blind holes 15c to open into a circumferential groove 33 provided along the outer surface of the spindle 15. The circumferential groove 33 is axially disposed in the outer surface of the spindle 15 to face to the bearing side lubricant passages 19d provided in the inner race 19a of the bearing 19 when the spindle apparatus 11 is assembled. A recess 33a is preferably provided in the bottom of the circumferential groove 33 about each of the spindle side lubricant passages 15e to encompass the opening end of each of the spindle side lubricant passages 15e. A piece 35 including an orifice 35a, as means for flow rate adjustment, is fitted and secured to the recess 33a.

Although a detailed description is omitted, each of the spindle side lubricant passages 15f and 15g also radially outwardly extend from each of the blind holes 15c and 15d to open into circumferential grooves provided along the outer surface of the spindle 15 which are axially disposed in the outer surface of the spindle 15 to face to the bearing side lubricant passages 21d and 23d provided in the inner races 21a and 23a of the bearings 21 and 23 when the spindle apparatus 11 is assembled. Recess are also provided in the bottoms of the circumferential grooves about each of the spindle side lubricant passages 15f and 15g. Pieces 37 and 39 including orifices 37a and 39a, as means for flow rate adjustment, are fitted and secured to the recesses.

In this embodiment, the spindle side lubricant passages 15e, 15f and 15g, circumferential grooves 33 and bearing side lubricant passages 19d, 21, and 23d provide radial passages. The radial passages are not limited to a configuration which extend toward the rolling members 19c, 21 and 23c within the bearings 19, 21 and 23. The radial passages may be provided adjacent the bearings 19, 21 and 23 to supply the lubricant into the bearings 19, 21 and 23.

The functional operation of the embodiment will be described below.

When the spindle 15 rotates, the liquid lubricant is separated and discharged from the holding members of the lubricant impregnated members 25 and 29 due to the centrifugal force acting on the liquid lubricant impregnated to the lubricant impregnated members 25 and 29. The liquid lubricant from the lubricant impregnated members 25 and 29 attaches to the inner surfaces of the blind holes 15c and 15. From there, the liquid lubricant is introduced into the spindle side lubricant passages 15e, 15f and 15g to flow through the circumferential grooves 33 and the bearing side lubricant passages 19d, 21d and 23d to the spaces between the inner and outer races 19a, 19b; 21a, 21b and 23a, 23b of the respective bearings 19, 21 and 23. The energy of the centrifugal force is consumed to separate the liquid lubricant from the holding members of the lubricant impregnated members 25 and 29 to prevent excessive supply of lubricant to the bearings as in the conventional under-race lubrication. Further, the liquid lubricant is supplied to the bearings 19, 21 and 23 from the lubricant impregnated members 25 and 29, which are inserted into the blind holes 15c and 15 and insulated from the outside by the closures 27 and 31, through the spindle side lubricant passages 15e, 15f and 15g and the bearing side lubricant passages 19d, 21d and 23d. Therefore, contamination into the lubricant which may result in rapid wear of the bearings 19, 21 and 23 as in the prior art, can be prevented.

Adjustment of diameters of the orifices 35a, 37a and 39a of the pieces 35, 37 and 39, which are provided in the spindle side lubricant passages 15e, 15f and 15, as described above, allows the optimal adjustment of the lubricant flow rate therethrough for the diameter or the rotational speed of the spindle 15. Further, the thickness, pore size and number of density of the pores of the microporous membrane member which may be applied or tightly coupled to the outer surface of the lubricant impregnated members 25 and 29 are advantageously selected.

Although the embodiment includes three bearings 19, 21 and 23, the invention is not limited to this configuration. At least two bearings each of which is disposed at the distal and rear ends of the spindle 15 are required. Further, the bearings 19, 21 and 23 comprise ball bearings. However, the invention is not limited to this configuration and roller bearings which include rollers as the rolling members or plain bearings without rolling members can be used. If the bearings comprise plain bearings, the bearing side lubricant passages and the circumferential grooves in the outer surface of the spindle 15 are not essential and the radial passage can include only the spindle side lubricant passages.

The lubricant impregnated members 25 and 29 may be disposed in the spindle 15 unevenly around the axis. Further, the positions of the lubricant impregnated members 25 and 29 are not limited to around the axis. Essential configuration is that the liquid lubricant is separated and discharged from the lubricant impregnated members 25 and 29 by the centrifugal force due to the rotation of the spindle 15.

Further, in this embodiment, the radial passages are provided, as a lubricant supply passage, in the inner races 19a, 21a and 23a of the bearings 19, 21 and 23. However, another embodiment may includes colors, for supporting the inner races 19a, 21a and 23a, which include the radial passages.

The orifices 35a, 37a and 39a are indicated as means for adjusting flow rate of the liquid lubricant. However, they are not essential to the invention. Further, the invention can include the orifice 35a, 37a and 39a and/or the membrane. Further, the flow rate of the liquid lubricant may be adjusted by the characteristics of the material of the holder members of the lubricant impregnated members 25 and 29 or the viscosity of the liquid lubricant.

Pockets may be provide, at the sides of the corresponding bearings 19, 21 and 23, for receiving liquid lubricant supplied from the lubricant impregnated members 25 and 29 to the bearings 19, 21 and 23. The liquid lubricant in the pockets may flow into the bearings 19, 21 and 23 to compensate an insufficient lubrication under high speed rotation of the spindle.

Figure 2:
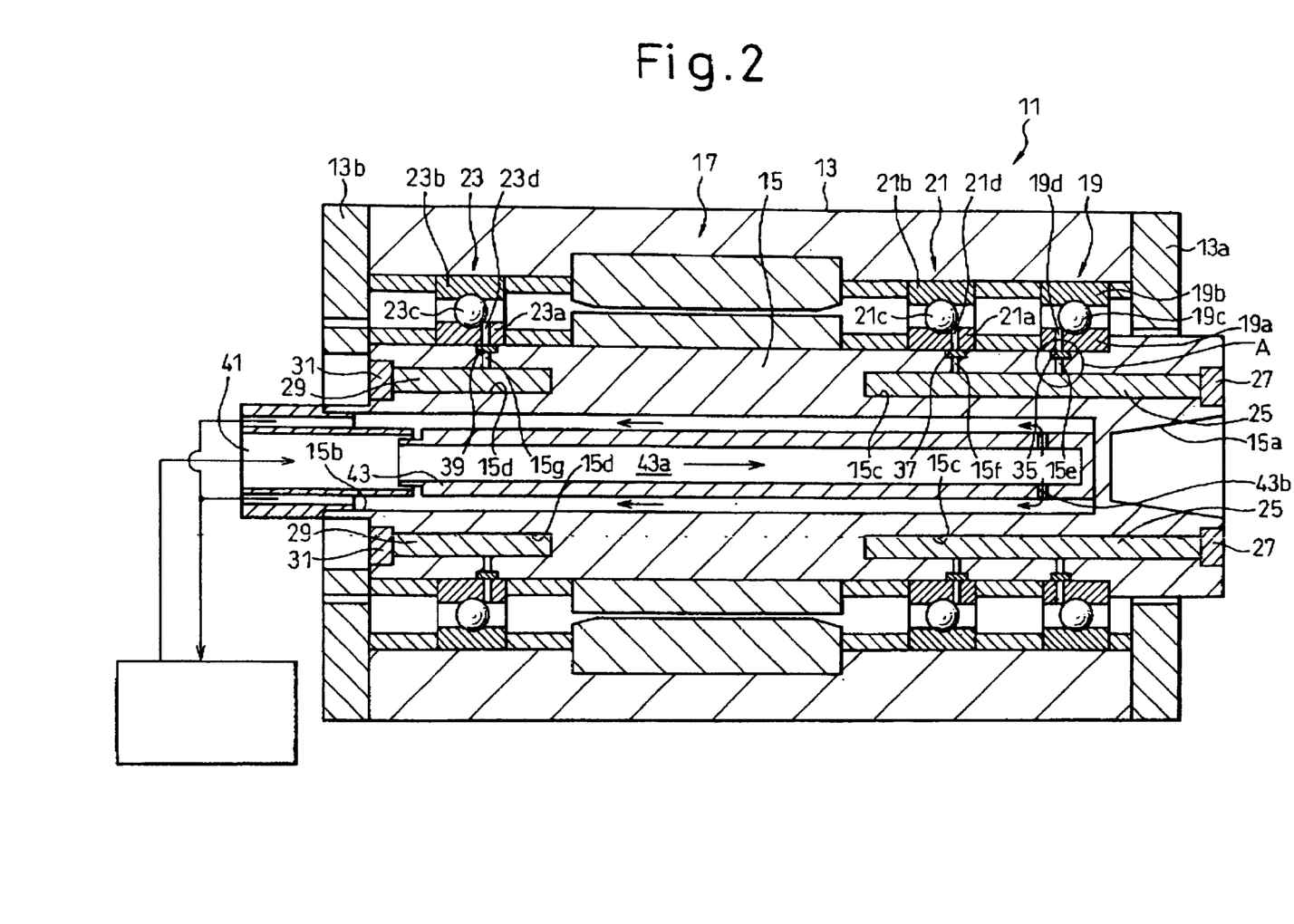
FIG. 2 is a longitudinal section of a second embodiment of the rotating shaft apparatus according to the invention.

Referring to FIG. 2, a second embodiment of the invention will be described below. Elements corresponding to those in FIG. 1 are indicated by the same reference numbers and the corresponding descriptions are omitted in the following description.

The feature of the embodiment of FIG. 2 is provision of a spindle core conduit, for a cooling liquid, within the axially extending cavity 15b of the spindle 15. The spindle core conduit 43 is sealingly coupled to a rotary joint 41 by a coupling portion 43a. On the other end of the spindle core conduit 43, a plurality of openings 43b are provided. In this particular embodiment shown, the openings 43b of the spindle core conduit 43b are disposed adjacent the distal end of the spindle core conduit 43, and the axial cavity 15b of the spindle 15 extends to overlap relative to at least a portion of the bearings 19 and 21 provided at the distal end portion of the spindle 15. The rotary joint 41 is a conventional joint for supplying a liquid to a rotating member such as the spindle 15, and is connected to a coolant supplying and circulating apparatus 45 provided outside of the spindle apparatus 11. The coolant supplying and circulating apparatus 45 include, as a major components, a tank for holding a liquid coolant, pump for circulating the liquid coolant, a device for cooling the used liquid coolant to a predetermined temperature and a control valve for controlling the flow of the liquid coolant.

The functional operation of the embodiment will be described below.

When the spindle 15 rotates, as in the first embodiment, the liquid lubricant, separated and discharged from the holding members of the lubricant impregnated members 25 and 29 due to the centrifugal force acting on the liquid lubricant impregnated to the lubricant impregnated members 25 and 29, is supplied to the spaces between the inner and outer races 19a, 19b; 21a, 21b and 23a, 23b of the respective bearings 19, 21 and 23.

In this embodiment, the liquid coolant is supplied to the spindle core conduit 43 through the rotary joint 41, which may include two passages for supplying and recovering the liquid coolant for cooing the spindle core, from the coolant supplying and circulating apparatus 45 provided outside of the spindle apparatus 11, prior to or at the time of the rotation of the spindle 15. The liquid coolant supplied to the spindle core conduit 43 flows in the cavity 43a of the spindle core conduit 43, as shown by the arrows in FIG. 1, and into a gap "G" between the spindle core conduit 43 and the cavity 15b of the spindle 15 through the openings 43b provided at the distal end. The liquid coolant flows through the gap "G" in the counter direction toward the rotary joint 41 and is circulated to the coolant supplying and circulating apparatus 45 provided outside of the spindle apparatus 11. The liquid coolant, when it flows through the gap "G", cools the spindle 15 from the inner surface of the cavity 15b. As described above, the openings 43b of the spindle core conduit 43 are particularly provided adjacent the distal end of the spindle core conduit 43, and the cavity 15b of the spindle 15 is long enough to overlap relative to at least a portion of the distal side bearings 19 and 21. Therefore, the distal end portion of the spindle 15, where the heated condition becomes severe due to the heat generation in the bearings 19 and 21, is effectively cooled by the liquid coolant supplied to the distal end of the spindle 15 to prevent the temperature increase in the spindle 15. It is apparent that the temperature increase in the spindle 15 caused by the heat generation in the bearing 23 is also prevented. In the embodiment, the cavity 43a of the spindle core conduit 43, the openings 43b and the gap "G" between the spindle core conduit 43 and the cavity 15b of the spindle 15 provide means for cooling the spindle core.

In the prior art, the liquid coolant for cooling the spindle 15 also used to lubricate and cool the bearings 19, 21 and 23. According to the embodiment, different from the prior art, the liquid coolant is supplied to cool the core of the spindle 15 separately from the liquid lubricant for the bearings 19, 21 and 23. This allows optimum selection and amount of supply of the liquid lubricant for the lubrication of the bearings 19, 21 and 23 and the liquid coolant for cooling the spindle 15.

Further, circumferential grooves or a spiral groove may be provided in portions the inner surface of the cavity of the housing 13 where the outer races 19b, 21b and 23b of the bearings 19, 21 and 23 and/or the built-in motor 17 are fitted. The liquid coolant may be supplied to the grooves from the coolant supplying and circulating apparatus 45 to cool the bearings 19, 21 and 23 and/or the built-in motor 17. In this case, the liquid coolant may be supplied first into the spindle 15 to cool the spindle 15, then from the spindle 15 to the circumferential grooves or the spiral groove provided in the housing, and, after the cooling of the housing 13, recirculated to the external coolant supplying and circulating apparatus 45.

Although, in the above description, embodiments of the lubricant impregnated members 25 and 29 which are mounted to the spindle 15 of the spindle apparatus 11, the lubricant impregnated members can be mounted to the X-feed screw (not shown), Y-feed screw 69 and Z-feed screw 65 to cool the bearings for rotationally supporting the respective feed screws.

The invention can be applied to a machine tool other than a milling machine, a machining center, a grinding machine, a lathe, an electric discharge machine.

What is claimed is:

1. A rotating shaft apparatus for driving a shaft rotationally supported by a housing, comprising:

a bearing for rotationally supporting the shaft in the housing, the bearing being previously applied to or filled with a lubricant;

a plurality of lubricant impregnated members, which are disposed in a peripheral portion of the shaft around the center axis thereof and impregnated with a lubricant to be supplied to the bearing, and provided in the rotating shaft, for separating and discharging the lubricant by centrifugal force due to the rotation of the shaft; and a lubricant supplying passage for fluidly connecting a space in or adjacent the bearing to the lubricant impregnated members to supply the lubricant which has been separated and discharged from the lubricant impregnated members.

2. A rotating shaft apparatus according to claim 1 wherein the lubricant impregnated members include a permeable material or a non-woven material to which the lubricant is impregnated.

3. A rotating shaft apparatus according to claim 1 further comprising adjustment means for adjusting the rate of the lubricant supplied to the bearing from the lubricant impregnated members.

4. A rotating shaft apparatus according to claim 1 further comprising core cooling means which is provided in the shaft and includes passages for supplying liquid coolant from a coolant supplying and circulating apparatus, and for recovering the liquid coolant used for cooling the rotating shaft.

5. A machine tool for machining a workpiece by relatively moving a tool and the workpiece to each other, comprising:

a table for mounting the workpiece;

a feed mechanism for driving X-, Y- and Z-feed shafts for relatively moving a spindle to which the tool is mounted and the table to each other;

a spindle to which the tool is mounted and is rotationally supported by a spindle head;

a bearing for rotationally supporting the spindle to the spindle head;

a plurality of lubricant impregnated members, which are disposed in a peripheral portion of the spindle around the center axis thereof and impregnated with a lubricant to be supplied to the bearing and provided in the rotating spindle, for separating and discharging the lubricant by centrifugal force due to the rotation of the spindle; and a lubricant supplying passage for fluidly connecting a space in or adjacent the bearing to the lubricant impregnated members to supply the lubricant which has been separated and discharged from the lubricant impregnated members.

6. A machine tool according to claim 5 further comprising core cooling means which is provided in the spindle and includes passages for supplying liquid coolant from a coolant supplying and circulating apparatus, and for recovering the liquid coolant used for cooling the rotating spindle.

7. A machine tool for machining a workpiece by relatively moving a tool and the workpiece to each other, comprising:

a feed mechanism for driving X-, Y- and Z-feed shafts for relatively moving a spindle and a table to each other;

a bearing for rotationally supporting the feed shafts of the feed mechanism;

a plurality of lubricant impregnated members, which are disposed in a peripheral portion of the feed shafts around the center axis thereof and impregnated with a lubricant to be supplied to the bearing, and provided in the rotating feed shafts, for separating and discharging the lubricant by centrifugal force due to the rotation of the feed shafts; and a lubricant supplying passage for fluidly connecting a space in or adjacent the bearing to the lubricant impregnated members to supply the lubricant which has been separated and discharged from the lubricant impregnated members.

* * * * *